(12) United States Patent
Weavind et al.

(10) Patent No.: US 9,736,025 B2
(45) Date of Patent: Aug. 15, 2017

(54) DETERMINING SERVICE DEPENDENCIES FOR CONFIGURATION ITEMS

(75) Inventors: Glenn Peter Weavind, Eastleigh (GB); Kieron John James Connelly, Brighton (GB); Darren Anthony Koch, Hitchin (GB)

(73) Assignee: CA, Inc., New York, NY (US)

( * ) Notice: Subject to any disclaimer, the term of this patent is extended or adjusted under 35 U.S.C. 154(b) by 573 days.

(21) Appl. No.: 13/546,795

(22) Filed: Jul. 11, 2012

(65) Prior Publication Data
US 2014/0019611 A1 Jan. 16, 2014

(51) Int. Cl.
*G06F 15/173* (2006.01)
*H04L 12/24* (2006.01)

(52) U.S. Cl.
CPC .......... *H04L 41/0853* (2013.01); *H04L 41/22* (2013.01)

(58) Field of Classification Search
CPC .... H04L 29/08072; H04L 29/06; H04L 43/00
USPC ...................................................... 709/224
See application file for complete search history.

(56) References Cited

U.S. PATENT DOCUMENTS

| | | | | |
|---|---|---|---|---|
| 2006/0064481 A1* | 3/2006 | Baron | ................. | H04L 41/0886 709/224 |
| 2008/0209005 A1* | 8/2008 | Akamatsu | ............... | H04L 12/24 709/217 |
| 2008/0263084 A1* | 10/2008 | Faihe | ................ | G06F 17/30923 |
| 2010/0241891 A1* | 9/2010 | Beasley | ............... | G06F 11/008 714/1 |
| 2012/0155467 A1* | 6/2012 | Appenzeller | ........... | H04L 45/54 370/392 |
| 2013/0054220 A1* | 2/2013 | Gupta | ................ | G06F 11/3006 703/22 |

\* cited by examiner

*Primary Examiner* — Vivek Srivastava
*Assistant Examiner* — Hermon Asres
(74) *Attorney, Agent, or Firm* — Baker Botts L.L.P.

(57) ABSTRACT

Systems, apparatus, methods, and computer program products for determining which of a plurality of services provided by a production environment depend on which of a plurality of configuration items in the production environment are disclosed. A processor executes computer-readable code to obtain status data for the plurality configuration items utilizing the one or more monitoring tools, integrate the status data for the plurality of configuration items to generate a model of the production environment that identifies the plurality of configuration items in the production environment and their dependencies on one another, and utilize the status data for the plurality of configuration items to identify a channel of configuration items for each of the plurality of services, wherein the channel for each of the plurality of services comprises two or more of the plurality of configuration items that currently are being utilized to provide that service.

21 Claims, 6 Drawing Sheets

DETERMINING SERVICE DEPENDENCIES FOR CONFIGURATION ITEMS

BACKGROUND

The present disclosure generally relates to determining service dependencies for configuration items. The disclosed embodiments relate more specifically to systems, apparatus, methods, and computer program products for identifying, on request, all of the services that depend on a configuration item.

The Information Technology Infrastructure Library (ITIL) is a set of practices for Information Technology (IT) service management that focuses on aligning IT services with the needs of a business. Because the IT services of a business must ultimately meet the demands of the services' customers and users, customers and users are the entry point to the process model. Accordingly, customers and users may become involved in service support by requesting changes and/or updates to the IT services to address certain problems and/or needs. Implementing such changes and/or updates requires the person who is responsible for implementation to define what services depend on any Configuration Item (CI) that is to be changed and/or updated and may initiate a chain of processes that includes: 1) incident management, 2) problem management, 3) change management, 4) release management, and 5) configuration management. That chain of processes is tracked using the Configuration Management Database (CMDB), which contains the details of the CIs in the IT infrastructure and their relationships to each other.

A CI is any component of an IT infrastructure that is under the control of configuration management. CIs can be individually managed and versioned, and they are usually treated as self-contained units for the purposes of identification and change control within the IT infrastructure. The relationships between different CIs are modeled as data structures in the CMDB. Nevertheless, the CMDB is relatively static because, in the ITIL model, the changes to the CMDB may only be made via a formal change management process.

The value of the CMDB is derived from the formal change management process. Under the formal change management process that is required to modify a CMDB, it generally takes three (3) to five (5) days from when the change request is submitted to when the change is implemented. That time is required to allow for careful consideration and review of the change—the objective being to ensure that the change doesn't have any unexpected and/or undesirable effects. Even an emergency change would normally require at least several hours between the change request and implementation. Thus, the CMDB serves as a somewhat static reference standard of the CIs and their relationships within an IT infrastructure.

Although attempts have been made to increase the speed at which CIs are updated in a CMDB utilizing automated discovery tools, those discovery tools still take between fifteen (15) minutes to an hour to perform a discovery cycle and update the CMDB. Moreover, those discovery tools implement repeated discovery cycles that provide un-controlled inputs to the CMDB such that there is no formal change control to ensure that the CMDB maintains its integrity. Moreover, the relationships in the CMDB still lag behind the changes in the environment that the CMDB attempts to describe.

For example, in a production environment, several virtual servers may be moved from one host to another over a few minutes, completely changing their relationships to the physical machines hosting them and to the network infrastructure connecting them. They may even move between Data Centers. As a result, the data in a CMDB that describes the service model could be completely incorrect if such a change occurs during the fifteen (15) minutes to an hour that it takes to perform a discovery cycle and update the CMDB. And taking down a CI for maintenance may be very costly if done without an accurate understanding of the other CIs that will be effected.

BRIEF SUMMARY

The present disclosure is directed to systems, apparatus, methods, and computer program products for determining which of a plurality of services provided by a production environment depend on which of a plurality of configuration items in the production environment. Embodiments of the apparatus comprise a memory configured to store computer-readable program code comprising one or more monitoring tools and a processor configured to execute the computer-readable code. The processor is configured to execute the computer-readable code to obtain status data for the plurality configuration items utilizing the one or more monitoring tools, integrate the status data for the plurality of configuration items to generate a model of the production environment that identifies the plurality of configuration items in the production environment and their dependencies on one another, and utilize the status data for the plurality of configuration items to identify a channel of configuration items for each of the plurality of services, wherein the channel for each of the plurality of services comprises two or more of the plurality of configuration items that currently are being utilized to provide that service. The processor is further configured to execute the computer-readable code to separate each of the services into a plurality of service models comprising each of the configuration items that the channel for that service comprises, and to separate each of the plurality of service models into a plurality of service layers that each corresponds to a type of supported functionality provided by one or more configuration item in that service layer.

BRIEF DESCRIPTION OF THE DRAWINGS

Aspects of the present disclosure are illustrated by way of example and are not limited by the accompanying figures with like references indicating like elements.

In those figures, like reference numerals refer to like parts, components, structures, and/or processes.

DETAILED DESCRIPTION

Figure 1:
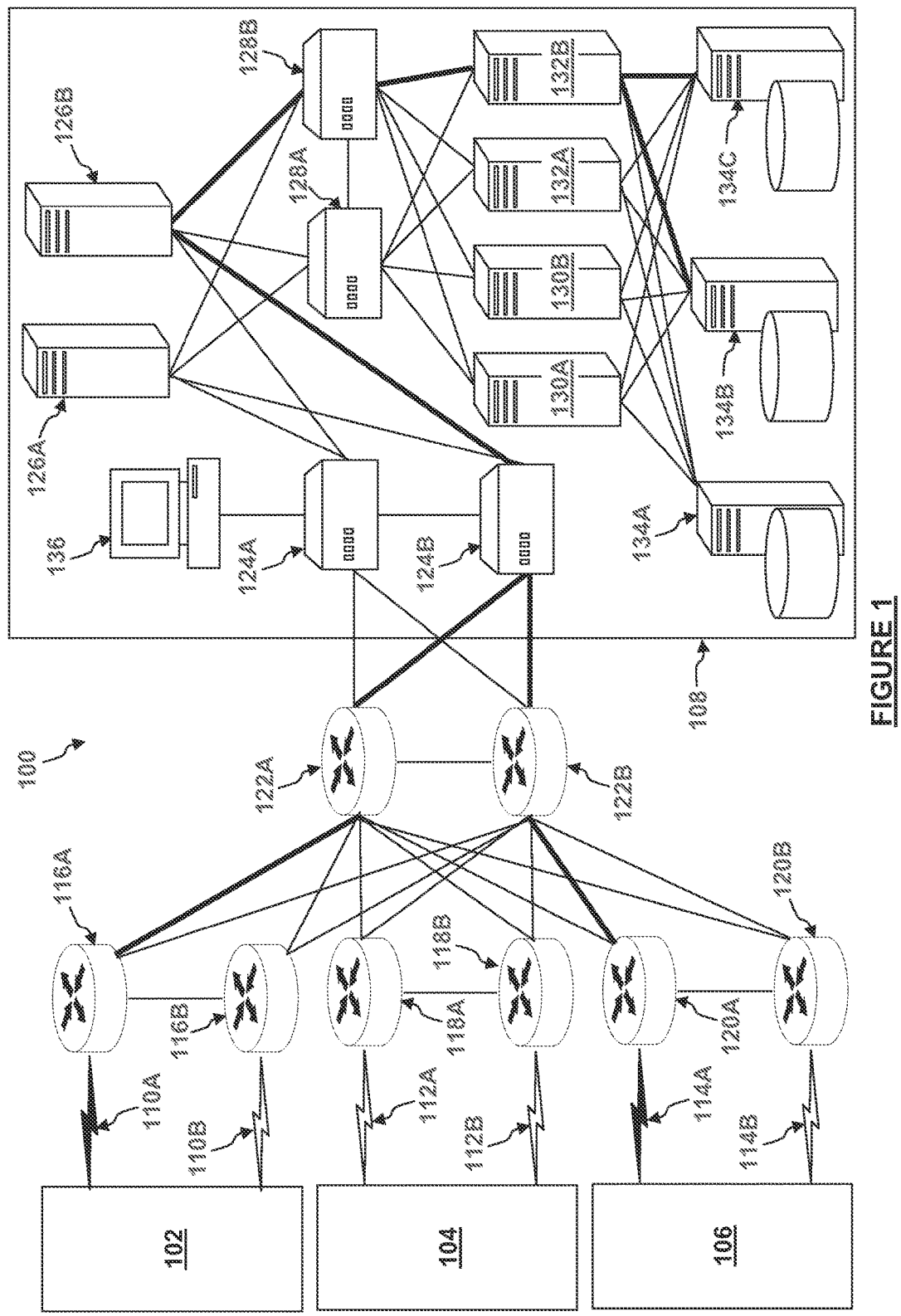
FIG. 1 is a schematic diagram illustrating a production environment according to embodiments of the present disclosure.

As will be understood by those of ordinary skill in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or by combining software and hardware implementations that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, radio frequency (RF), or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like; conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may be executed entirely on a user's computer, partly on the user's computer, as a stand-alone software package, partly on the user's computer and partly on a remote computer, or entirely on the remote computer or server. The remote computer or server may be connected to the user's computer through any type of network, including a local area network (LAN), a wide area network (WAN), or a cellular network. The connection also may be made to an external computer or server (e.g., through the Internet using an Internet Service Provider) in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. Those computer program instructions may be provided to a processor of a general purpose computer, special purpose computer, or other programmable data processing apparatus to produce a machine, such that the instructions, which are executed via the processor of the computer or other programmable instruction execution apparatus, create a mechanism for implementing the functions/acts specified in the flowchart and/or block diagram block or blocks.

Those computer program instructions may also be stored in a computer-readable medium that, when executed, can direct a computer, other programmable data processing apparatus, or other devices to function in a particular manner, such that the instructions, when stored in the computer-readable medium, produce an article of manufacture that includes instructions which, when executed, cause a computer to implement the function/act specified in the flowchart and/or block diagram block or blocks. The computer program instructions also may be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

For a more complete understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

Turning to the drawings, FIG. 1 illustrates a production environment 100 according to embodiments of the invention. The production environment 100 comprises a first client network 102, a second client network 104, a third client network 106, a service provider 108, an a plurality of CIs 110A-134C. The CIs 110A-134C include a first pair of WAN connections 110A and 110B; a second pair of WAN connections 112A and 112B; a third pair of WAN connections 114A and 114B; a first pair of edge routers 116A and 116B: a second pair of edge routers 118A and 118B; a third pair of edge routers 120A and 120B; a pair of distribution routers 122A and 122B; a first pair of load balancers 124A and 124B; a pair of authentication servers 126A and 126B; a second pair of load balancers 128A and 128B; a first pair of application servers 130A and 130B: a second pair of application servers 132A and 132B; and three (3) database servers 134A, 134B, and 134C. The production environment further comprises a configuration management system 136.

The WAN connections 110A-114B are configured to connect the client networks 102-106 to the service provider 108 so that the clients within those client networks 102-106 may receive services from the service provider 108. The edge routers 116A-120B are configured to route data traffic to and from the client networks at the edge of the production environment 100. The distribution routers 122A and 122B are configured to distribute and collect the data traffic to and from the various edge routers 116A-120B. The load balancers 124A, 124B, 128A, and 128B are configured to distribute workloads across the different servers 126A, 126B, 130A-132B, and 134A-134C at the service provider 108. The authentication servers 126A and 126B are configured to authenticate incoming messages from the client networks 102-106. The application servers 130A-132B are configured to support the various services and sub-services provided to the client networks 102-106 by the service provider 108. And the database servers 134A-134C are configured to provide database services to the application servers 130A-132B.

The production environment 100 comprises two or more of each different type of CI to provide redundancy and resiliency of infrastructure, which protects against a loss of service if any one of those CIs 110A-134C fails or must be taken off line. For example, the first client network 102 may connect to the service provider 108 via an alpha first WAN connection 110A or a beta first WAN connection 110B in case the service provided by one of the Internet Service Providers (ISPs) that provides one of those WAN connections 110A or 110B (e.g., VERIZON brand ISP, AT&T brand ISP, etc.) is lost and/or in case a client within the first client network 102 utilizes a communication protocol that is only supported by one of those WAN connections 110A or 110B (e.g., X.25 network protocol, IP network protocol, etc.). And as another example, each of the second pair of load balancers 128A and 128B may select whether an alpha first application server 130A or a beta first application server 130B should be utilized to process a particular transaction based on the current load on each of those two first application servers 130A and 130B. Thus, at any given time, the services and sub-services provided by the service provider 108 may be supported by large numbers of different interfaces made between large numbers of different CIs.

The numbers of CIs 110A-134C depicted in FIG. 1 are illustrative only and, in actual practice, the production environment 100 may include more or less than the number of each of the types of CIs depicted in FIG. 1. If the production environment 100 is configured to support payment card processing, for example, the service provider 108 may comprise more than two different pairs of application servers to support the various services and sub-services provided by the service provider 108. In that example, the service provider 108 may comprise one or more application servers dedicated to conducting payment card transactions with trusted merchants, one or more application servers dedicated to conducting payment card transactions with supported automatic teller machines (ATMs), one or more application servers dedicated to ATM usage monitoring, one or more application servers dedicated to identifying stolen payment cards, one or more application servers dedicated to purchase type validation, one or more application servers dedicated to identifying the issuer of a particular payment card, and one or more application servers dedicated to checking the credit limit set on a particular card. The service provider 108 also may comprise any number of load balancers, routers, or other CIs. As that example demonstrates, the number of CIs 110A-134C and the corresponding interfaces in the production environment 100 illustrated in FIG. 1 may be larger in number than is depicted in that figure. Nevertheless, the number and types of CIs depicted in the production environment 100 illustrated in FIG. 1 were selected for clarity and ease of explanation.

Figure 2:
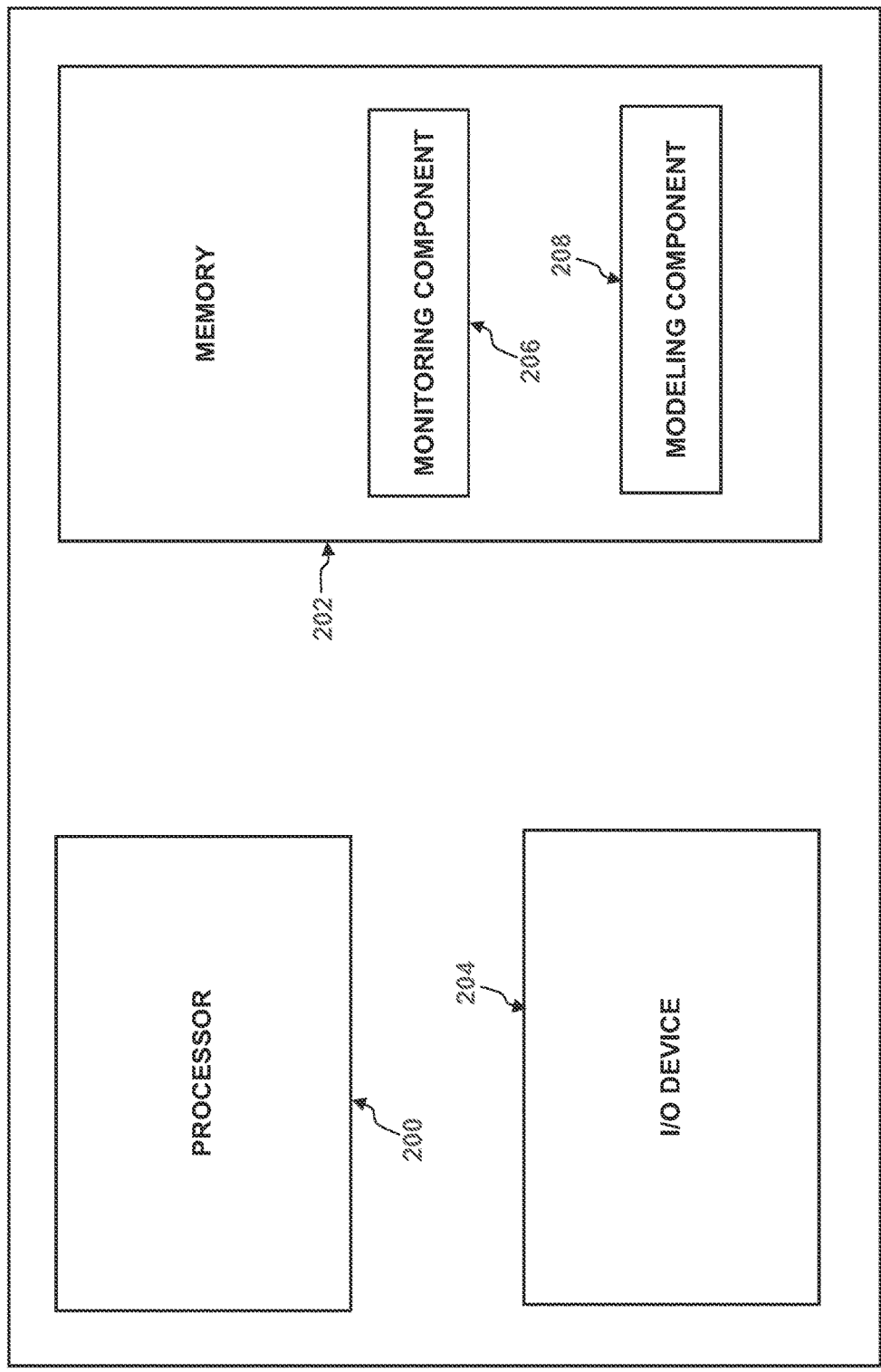
FIG. 2 is block diagram illustrating a configuration management system according to embodiments of the present disclosure.

Turning to FIG. 2, the configuration management system 136 comprises a processor 200, a memory 202, and an input/output (I/O) device 204. The processor 200 may comprise any number of suitable CPUs that are configured to execute the computer program code embodied on the memory 202 and to perform the various functions of the configuration management system 136. The memory 202 may comprise one or more types of memory (e.g., ROM, RAM, EEPROM, etc.) as required to store the computer program code executed by the processor 200 and to support the execution of that code. In FIG. 2, the memory 202 is depicted as storing computer program code comprising a monitoring component 206 and a modeling component 208 that are executed by the processor 200 to perform the various functions of the configuration management system 136 described below. And the I/O device 204 may comprise any number of suitable devices that are configured to receive input from a user (e.g., a keypad, a scanner, a camera, a microphone, etc.), any number of suitable devices that are configured to output data to a user in a meaningful manner (e.g., a display, a printer, a speaker, a tactile feedback, etc.), or any combination thereof (e.g., a touch screen, a data port, etc.).

The configuration management system 136 is configured to utilize a hierarchy of dynamic service models that show, on request, the actual hierarchy of services and sub-services that are dependent on any one CI at any given time so that all of the other CIs 110A-134C that are dependent on that CI for a particular service or sub-service, as well as all of the other services and sub-services that are dependent on any one of those CIs, can be identified. In particular, the configuration management system 136 utilizes the monitoring component 206 to obtain data for identifying the different CIs 110A-134C and their interrelationships, and utilizes the modeling component 208 to create a model of the CIs 110A-134C and their interrelationships, as depicted in FIG. 1. The monitoring component 206 utilizes network monitoring tools as the primary source of data for the CIs 110A-134C. And the modeling component 208 integrates the data obtained from all of those CIs 110A-134C to construct the model of the CIs 110A-134C and their interrelationships.

Monitoring tools generally are utilized to monitor networks for malfunctions at the CI level by monitoring various CIs for traffic-related information and generating an alert for a particular CI when a malfunction is identified at that CI. In other words, monitoring tools generally are utilized to obtain separate and discrete data feeds from various CIs, to utilize the traffic-related information in those data feeds to individually monitor the performance of each CI, and to generate an alert for an individual CI when that CI malfunctions. Such monitoring tools generally support that type of functionality by monitoring traffic-related information such as traffic volume, type of traffic, traffic destinations, traffic signaling events, processor loading, changes in router redundancy protocols (e.g., Hot Standby Router Protocol (HSRP), Virtual Router Redundancy Protocol (VRRP), Gateway Load Balancing Protocol (GLBP), etc.), virtual LAN (VLAN) changes, spanning-tree changes affecting blocking and forwarding interfaces, and layer-3 routing changes.

In addition to monitoring the foregoing types of traffic-related information, the monitoring component 206 of the configuration management system 136 is configured to monitor interface alias information. The functionality of the various CIs 110A-134C provides a label field in which free text may be entered, which is generally referred to as interface alias information. And in embodiments of the present disclosure, the label fields for those CIs 110A-134C are populated with client and/or service information, as well as circuit or contract information. For example, the label fields for the CIs that support a payment card processing service for a merchant (e.g., 110A, 116A, 122A, 124A, 126B, 128B, 132B, 134B, 134C, 124B, 122B, 120A, and 114A) may be populated with "merchant card services" such that polices may be created and implemented to identify which of the CIs 110A-134C have that text in their alias information.

By utilizing traffic-related information in combination with interface alias information, the modeling component not only is able identify all of the CIs 110A-134C in the production environment and their interrelationships, it also is able to determine which services depend on which CIs 110A-134C. Moreover, that information may be obtained for all of the CIs 110A-134C in the production environment 100, on request, via a plurality of simultaneous, real-time data feeds, rather than from a single CI when that CI malfunctions. The modeling component 208 then integrates those data feeds and utilizes the corresponding traffic-related information and interface alias information to construct a graphical representation of the production environment 100, thereby providing a unified view of the production environment 100, as depicted in FIG. 1. That graphical representation of the production environment 100 may be output to a user via the I/O device 204 (e.g., a display, a printer, etc.) of the configuration management system 136.

The configuration management system 136 not only is configured to construct a unified view of the production environment 100 with the modeling component 208, it also is configured to utilize the corresponding data feeds to reconcile the specific channels through which traffic is routed for the different services and sub-services that are supported by the production environment 100. The modeling component 208 also may depict those channels in the graphical representation of the production environment. For a payment card processing service for a merchant, for example, the configuration management system 136 may determine that a message from a merchant in the first client network 102 is being routed to a payment card issuer in the third client network 104 via the alpha first WAN connection 110A, the alpha first edge router 116A, the alpha first distribution router 122B, the beta first load balancer 124B, the beta authentication server 126B, the beta second load balancer 128B, the beta second application server 132B, the beta database server 134B and the charlie database server 134C, the beta first load balancer 124B, the beta distribution router 122B, the alpha third edge router 120A, and the alpha third WAN connection 114A, as depicted in FIG. 1 by the emboldened connector lines between CIs 110A, 116A, 122A, 124A, 126B, 128B, 132B, 134B, 134C, 124B, 122B, 120A, and 114A. And because the monitoring tools utilized by the monitoring component employ a variety of APIs and asynchronous notification methods to respond to changes in the infrastructure of the production environment 100 within seconds, the unified view of the production environment 100 and the specific channel through which traffic is routed for a particular service or sub-service is determined as it actually is, not as it used to be.

In addition to determining the current channel through which traffic is routed for a particular service or sub-service and the CIs that define that channel, the configuration management system 136 is further configured to determine the relationship between any one CI and every service and sub-service that depends on that CI. The modeling component 208 makes that determination by determining the current channel through which traffic is routed for every service and sub-service supported by the production environment 100. Because the monitoring component 206 receives a plurality of simultaneous, real-time data feeds from the various CIs 110A-134C, those different determinations are made for those different services and sub-services simultaneously, and in near real time. Thus, the configuration management system 136 is able to determine all the services and sub-services that depend on any particular CI 110A-134C at any particular moment.

The configuration management system 136 makes it simpler and easier to determine all the services and sub-services that depend on any particular node at any particular moment by breaking the overall business services supported by the production environment 100 down into a number of layered service models that behave in a way that matches the real world. In a typical production environment 100 there may be three (3) or more layers of services and sub-services that the configuration management system 136 may separate into independent but inter-related service layers that each correspond to a type of supported functionality provided by the CIs in that service layer, such as 1) network connectivity, 2) database/storage services, 3) application services, and 4) business services. That separation of service models simplifies the construction and maintenance of the service models and, by organizing those service models in a hierarchy, allows the configuration management system 136 to 1) automate the creation and maintenance of many of the service models and 2) devolve ownership of the different service model definitions to the people who would normally own the relevant domain.

For example, network administrators generally know how systems are interconnected and which routers, load balancers, firewalls, etc. are essential to delivering a service such as payment card authorization (i.e., the network connectivity layer). Database administrators generally know which databases are involved in checking to see if a payment card has been stolen, if the message from the retail store can be trusted, and which database provides information about who actually says "yes" or "no" for a particular transaction (i.e., the database/storage layer). Server administrators generally know which servers actually host databases, security systems, gateways to card issuers, etc. (i.e., the applications layer). And although non-IT personnel typically have the most knowledge about the overarching business services supported by those other services (i.e., the business layer), such high level business services rarely change their architecture because they are abstracted away from the dynamic infrastructure by lower-level sub-services. In that way a hierarchy of service models is built that copes with the dynamic nature of the infrastructure of the production environment 100 while still providing accurate service and sub-service dependency information for any given CI 110A-134C.

Because each of those service models behaves in a way that matches the real world, the interdependencies of the various CIs 110A-134C and services may be determined utilizing different technologies in each service layer. At the network connectivity layer, for example, the monitoring component 206 may utilize a first monitoring tool (e.g., SPECTRUM brand infrastructure management software from CA, Inc.) that regularly polls the network infrastructure (e.g., at five (5) minute intervals) and that also receives ad-hoc notifications of changes in the network infrastructure to determine which of the routers 116A-122B are active in an active/standby environment, as well as the links that connect the various CIs 110A-134C. The monitoring component 206 also may utilize a second monitoring tool (e.g., SPECTRUM brand infrastructure management software from CA, Inc. or the EHEALTH brand network performance management software from CA, Inc.) to monitor the status of the load-balancers 124A, 124B, 128A, and 128B by collecting information about their current connections. Further, the monitoring component 206 may utilize a third monitoring tool (e.g., SPECTRUM brand infrastructure management software from CA, Inc. with a ROUTE EXPLORER brand route analytics appliance from Packet Design, Inc.) to monitor layer-3 routing changes so that a shift in data traffic that is not caused by a layer-2 fault may be detected.

As another example, the monitoring component 206 may utilize a fourth monitoring tool (e.g., Application Performance Management software from CA, Inc.) at the applications layer to deploy agents on the application servers 130A-132B and maintain a constantly updated view of which transactions, both inbound and outbound, are occurring at which application server 130A, 130B, 132A, or 132B. If that fourth monitoring tool is not configured to provide proof of network connectivity, the monitoring component 206 also may utilize a fifth monitoring tool (e.g., Configuration Automation software from CA, Inc.) at the applications layer to interrogate the application servers 130A-132B to determine which are listening to any of the other CIs 110A-128B and 134A-134C, as well as which of the application servers 130A-132B are actively connected to any of those other CIs 110A-128B and 134A-134C. Similar monitoring tools also may be utilized to monitor the database servers 134A-134C at the database storage level (e.g., INSIGHT brand database performance monitoring software from CA, Inc.). Further, the monitoring component 206 may utilize a sixth monitoring tool (e.g., NetQoS ReporterAnalyzer from CA, Inc.) at either the network connectivity layer, the database/storage layer, or the applications layer to determine which of the CIs 110A-134C is communicating with which of the other CIs 110A-134C by utilizing flow information (e.g., IP Flow Information Export (IPFIX) information) to obtain regular updates on those interfaces.

The monitoring component 206 may utilize such monitoring tools to obtain the traffic-related information and interface alias information required by the modeling component 208 to generate graphical representation of the production environment 100 (e.g., FIG. 1). That same information may be utilized to generate a graphical representation of the service models 300, 400, 400', into which the production environment 100 may be separated (e.g., FIGS. 3-4B). And because that information is obtained simultaneously for all of the CIs 110A-134C on demand, rather than for a single CI in response to a malfunction at that CI, the graphical representations of the production environment 100 and the service models 300, 400, 400' that are generated by the modeling component 208 will accurately reflect the different CI and service dependencies as they currently are, not as they used to be.

Figure 3:
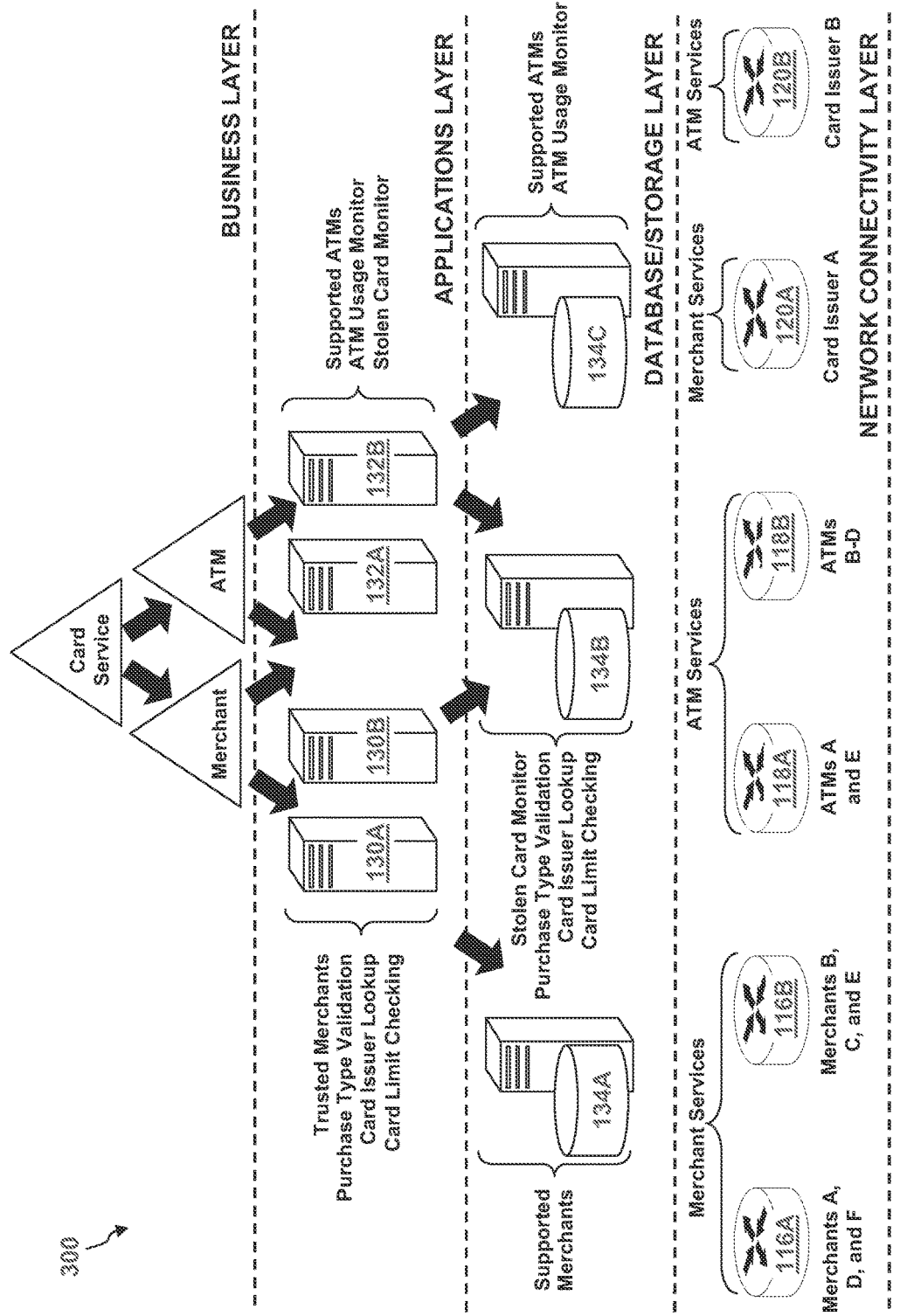
FIG. 3 is a schematic diagram of a hierarchy of service models for a production environment according to embodiments of the present disclosure.

Turning to FIG. 3, a hierarchy of service models 300 for a payment card service provided with the production environment 100 of FIG. 1 is illustrated. Within the business layer, FIG. 3 depicts that merchant services and ATM services fall under the overarching payment card service. Within the applications layer, FIG. 3 depicts that the first pair of application servers 130A and 130B is configured to conduct card-based transactions with trusted merchants, to validate transactions based on purchase type, to look up card issuers, and to check credit card limits; and that the second pair of application servers is configured to conduct card-based transactions with ATMs, to monitor ATM usage, and to monitor stolen cards. Although the authentication servers 126A and 126B also form part of the applications layer, they are omitted from FIG. 3 for clarity and ease of explanation.

Within the database/storage layer, FIG. 3 depicts that the alpha database server 134A is configured to manage data for the card-based transactions conducted with trusted merchants; that beta database server 134B is configured to manage data for the stolen card monitoring, for the purchase type validation, for the card issuer lookup, and for the card limit checking; and that the charlie database server 134C is configured to manage data for the card-based transactions conducted with supported ATMs and for ATM usage monitoring. And within the network connectivity layer, FIG. 3 depicts that the pair of first edge routers 116A and 116B is configured to provide connectivity for the purpose of providing merchant services to merchants A-F; that the pair of second edge routers 118A and 118B is configured to provide connectivity for the purpose of providing ATM services to ATMS A-D; and that the pair of third edge routers 120A and 120B is configured to provide connectivity for the purpose of providing merchant and ATM services to card issuers A and B. Although the pair of distribution routers 122A and 122B, the first pair of load balancers 124A and 124B, and the second pair of load balancers 128A and 128B also form part of the network connectivity layer, they are omitted from FIG. 3 for clarity and ease of explanation.

After separating the CIs 110A-134C and services of the production environment out into such a hierarchy of service models 300, the modeling component 208 outputs a graphical representation of those service models 300 via the I/O device 204 (e.g., a display, a printer, etc.). As FIG. 3 demonstrates, such a graphical representation provides an overview of the production environment 100 and identifies which services (i.e., merchant services and ATM services) and sub-services (i.e., trusted merchants processing, supported ATM processing, ATM usage monitoring, purchase type validation, card issuer lookup, card limit checking, and stolen card monitoring) currently are being supported by which CIs 110A-134C. Moreover, it identifies which merchants, ATMs, and card issuers currently are connected to those services and sub-services and, therefore, would be affected by any loss of those services or sub-services.

Figure 4A:
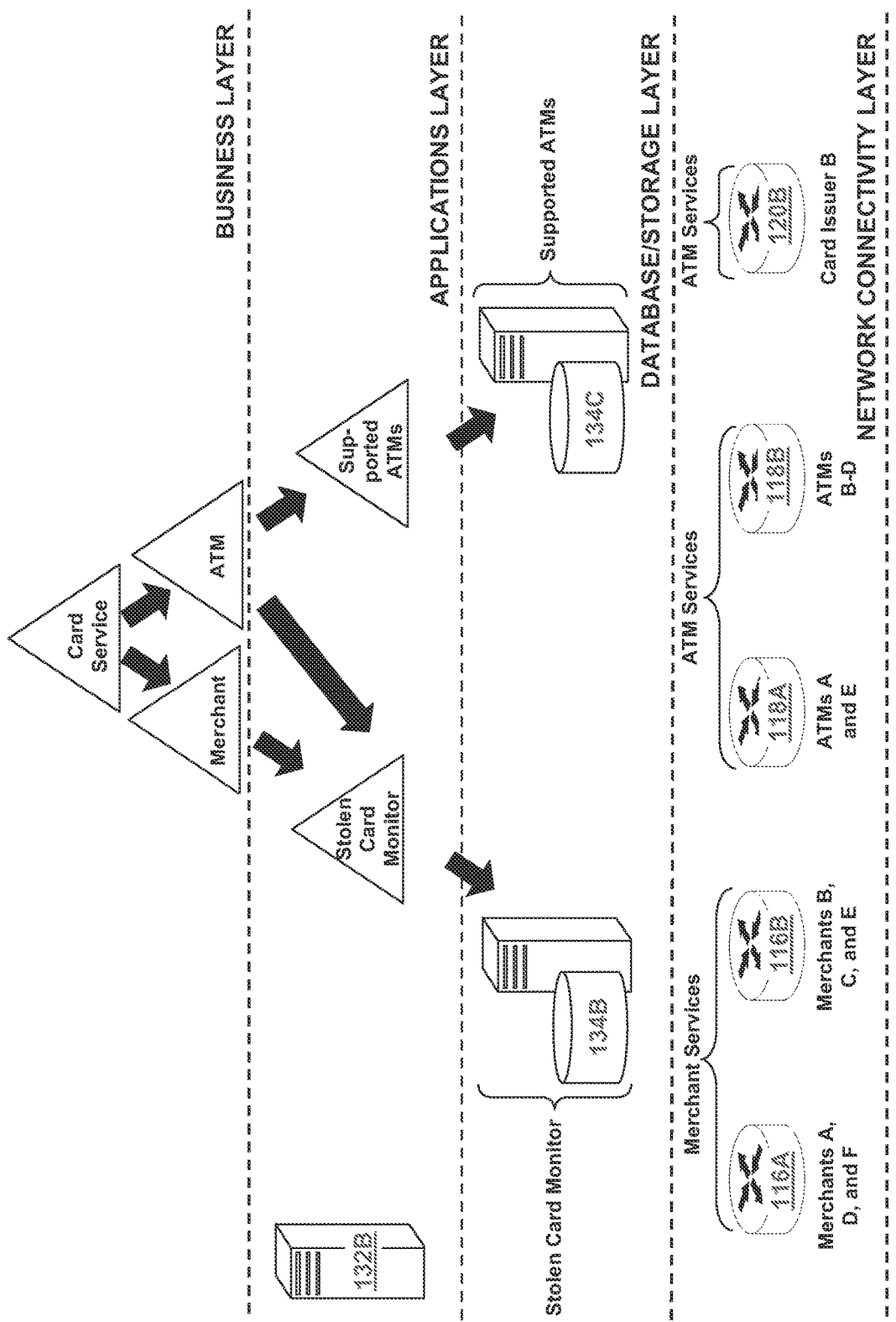
FIGS. 4A and 4B are schematic diagrams of hierarchies of service models for different CIs according to embodiments of the present disclosure.
Figure 4B:
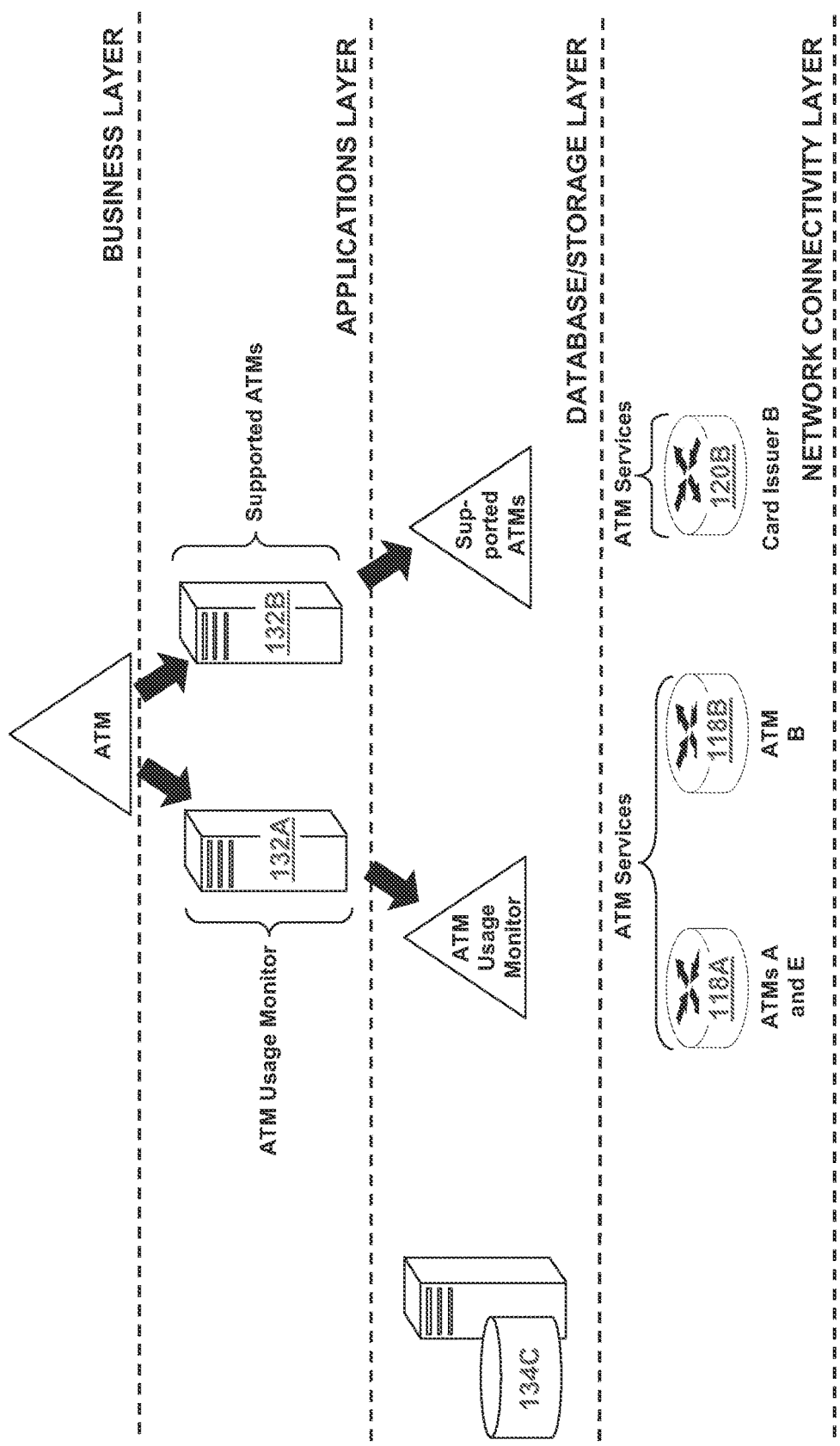

As FIGS. 4A and 4B illustrate, a user may drill down into the service models 300 by selecting any one of the CIs 110A-134C depicted in FIG. 3. A user may make such a selection with the I/O device 204 (e.g., mouse, touch screen, etc.) of the configuration management system 136 to determine which specific services currently depend on the selected CI. In FIG. 4A, for example, the user has selected the beta second application server 132B from the applications layer such that a service model 400 for that CI is generated. And in FIG. 4B, the user has selected the charlie database server 134C from the database/storage layer such that a service model 400' for that CI is generated. As a result of making such selections, the specific sub-services currently supported by the selected CIs are expanded out into the corresponding layer and the other layers are modified to depict the services and CIs currently affected by those sub-services.

In FIG. 4A, the specific sub-services supported by the beta second application server 132B are expanded out into the applications layer and the business layer is modified to depict that both the merchant services and the ATM services depend upon the stolen card monitoring sub-service and that only the ATM services depend on the supported ATM sub-service. Further, FIG. 4A depicts that the beta database server 134B is affected by the stolen card monitoring sub-service and that the charlie database server 134C is affected by the supported ATMs sub-service. And in the network connectivity layer, the alpha third edge router 120A is removed because card issuer A does not subscribe to the stolen card monitoring sub-service or any ATM services.

In FIG. 4B, the specific sub-services supported by the charlie database server 134C are expanded out into the database/storage layer and the applications layer is modified to depict the two application servers that depend on the charlie database server 134C for data management services (i.e., the alpha second application server 132A and the beta second application server 132B). As depicted in FIG. 4B, the alpha second application server 132A currently is supporting the ATM usage monitoring sub-service and the beta second application server 132B currently is supporting the supported ATMs sub-service. Although the beta second application server 132B also may currently be supporting the stolen card monitoring sub-service, that sub-service is not depicted in FIG. 4B because that sub-service currently does not depend on the selected CI (i.e., by the charlie database server 134C).

Further, the business layer in FIG. 4B is modified to depict that only the ATM services depend upon the sub-services affected by the charlie database server 134C. And in the network connectivity layer, the pair of first edge routers 116A and 116B and the alpha third edge router 120A are removed because the merchants and card issuer that connect to the service provider 108 via those routers 16A, 116B, and 120A do not subscribe to any ATM services. Moreover, ATMs C and D are no longer listed under beta second edge router 118B because those ATMs are not supported ATMs and the entities that maintain those ATMs do not subscribe to the ATM usage monitoring service.

As described above, the modeling component 208 generated the hierarchy of service models 400 and 400' depicted in FIGS. 4A and 4B in response to a user selecting the beta second application server 132B and selecting the charlie database server 134C, respectively, from the hierarchy of service models 300 depicted in FIG. 3. The modeling component 208 also may generate either of those graphical representations in response to a user selecting the corresponding CI 132B or 134C in either one of those graphical representations. For example, the modeling component 208 may generate FIG. 4B in response to a user selecting the charlie database server 134C depicted in FIG. 4A, or the modeling component 208 may generate FIG. 4A in response to a user selecting the beta second application server 132B depicted in FIG. 4B. If, for example, the I/O device 204 of the configuration management system 136 comprises a display and a mouse, a user may navigate between different graphical representations displayed on the display by selecting different CIs with the mouse.

Such functionality allows a user to quickly and efficiently determine the current CI and/or service dependencies for any CI 110A-134C in the production environment 100. And when used in conjunction with the unified view of the production environment 100, which identifies the specific channels through which traffic is routed for a particular service, a configuration management system 136 not only identifies which services will be affected by changes and/or updates to which CIs 110A 134C, the configuration management system 136 also may identify redundant CIs through which that service may be re-routed if a particular CI is taken off line to perform that change and/or update. In FIG. 1, for example, the configuration management system 136 may re-route the payment card processing service at the subject merchant(s) to the alpha second application server 132A to maintain continuity of that service when the beta second application server 132B must be taken off line.

Figure 5:
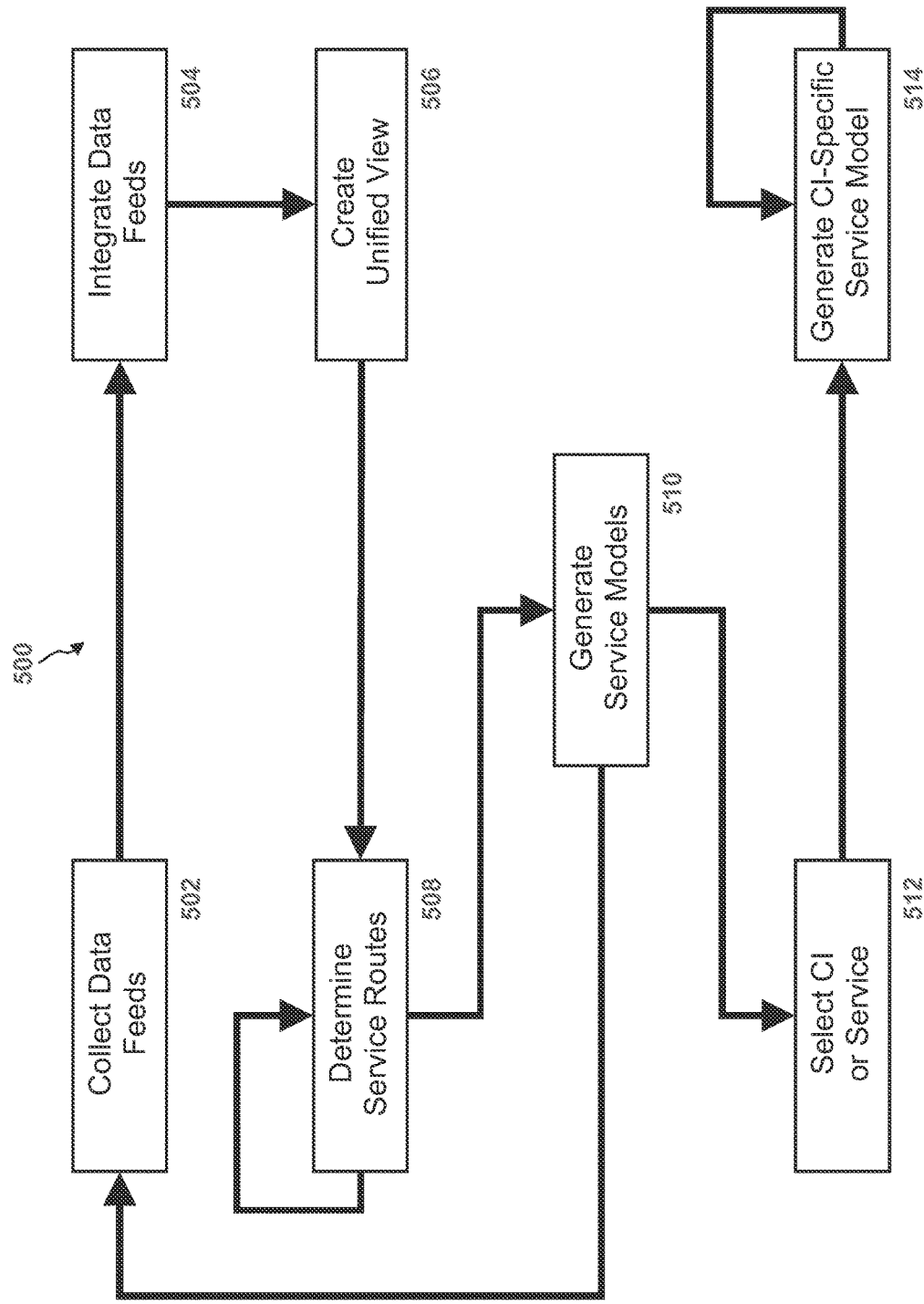
FIG. 5 is a flow chart illustrating a process for determining service dependencies for CIs according to embodiments of the present disclosure.

Turning to FIG. 5, a process for determining service dependencies for CIs 500 is illustrated. At step 502, the monitoring component 206 collects data feeds from all of the CIs 110A-134C in the production environment 100. At step 504, the modeling component 208 integrates those data feeds, which it utilizes to generate a unified view of the production environment 100 at step 506. At step 508, the modeling component 208 utilizes the data from those data feeds to reconcile the specific channels through which traffic currently is being routed for a particular service. The modeling component 208 repeats step 508 until the current routes are determined for all of the services and sub-services supported by the production environment 100. After all of the service routes are determined, the modeling component 208 breaks those services and their corresponding CIs 110A-134C out into their respective service models at step 510. Then, the modeling component 208 allows a user to select a specific CI at step 512, based on which it generates a more detailed, CI-specific service model for that CI at step 514. The user may repeat step 514 for different CIs as desired. Meanwhile, steps 402-410 may be repeated continuously in the background of the configuration management system 136 to ensure that the CI and service dependencies depicted in the resulting service models are current.

The schematic, block, and flow diagrams depicted in FIGS. 1-5 illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. An apparatus for determining which of a plurality of services provided by a production environment depend on which of a plurality of configuration items in the production environment, the apparatus comprising:
   a memory configured to store computer-readable program code comprising one or more monitoring tools; and
   a processor configured to execute the computer-readable code to:
monitor each of the plurality of configuration items in the production items via a separate data feed from each of the plurality of configuration items;
determine from each data feed which of the plurality of configuration items that each of the plurality of services currently depends upon in the production environment;
generate a model of the production environment based on the determination that identifies the plurality of configuration items in the production environment and their current dependencies; and
   identify a channel of configuration items through which traffic is routed for each of the plurality of services by identifying a first configuration item from among the plurality of configuration items that the service currently depends upon and at least a second configuration item from among the plurality of configuration items that currently depends on, or is depended on by, the first configuration item to provide the service,
   wherein each of the first configuration item and the second configuration item comprises redundant links and the dependency between the first configuration item and the second configuration item is determined based on which of the redundant links currently is being used;
   wherein each of the plurality of configuration items includes a label field in which interface alias information may be entered;
   wherein the interface alias information entered into the label field of each of the plurality of configuration items identifies which services each of the plurality of configuration items currently is supporting; and
   wherein the processor is configured to execute the computer-readable code to identify each of the plurality of configuration items that each service currently depends upon using the data feed from each of the plurality of configuration items in combination with the interface alias information included in the label field of each of the plurality of configuration items.

2. The apparatus of claim 1, wherein the processor is further configured to execute the computer-readable code to:
   separate each of the services into a plurality of service models comprising each of the configuration items that the channel for that service comprises; and
   separate each of the plurality of service models into a plurality of service layers that each corresponds to a type of supported functionality provided by one or more configuration item in that service layer.

3. The apparatus of claim 2, wherein the processor is further configured to generate a graphical representation of the service models that depicts each of the configuration items that corresponds to the type of functionality of that service layer.

4. The apparatus of claim 3, wherein the graphical representation of the service models further depicts each service that depends on each of the configuration items.

5. The apparatus of claim 4, wherein the processor is further configured to generate a graphical representation of the services and configuration items that depend from any one configuration item when that one configuration item is selected from the graphical representation of the service models.

6. The apparatus of claim 2, wherein the service layers comprise two or more of:
   an applications layer that corresponds to one or more of the plurality of configuration items that is configured to provide one or more applications that corresponds to one or more of the plurality of services;
   a data storage layer that corresponds to one or more of the plurality of configuration items that is configured to manage data for the one or more applications; and
   a network connectivity layer that corresponds to one or more of the plurality of configuration items that is configured to connect the configuration items in the applications layer and the data storage layer to each other and/or a client.

7. The apparatus of claim 1, wherein the processor is further configured to generate a graphical representation of the production environment that depicts the plurality of configuration items and their dependencies on one another.

8. A method for determining which of a plurality of services provided by a production environment depend on which of a plurality of configuration items in the production environment, the method comprising executing computer-readable program code with a processor to:
   monitor each of the plurality of configuration items in the production items via a separate data feed from each of the plurality of configuration items;
   determine from each data feed which of the plurality of configuration items that each of the plurality of services currently depends upon in the production environment;
   generate a model of the production environment based on the determination that identifies the plurality of configuration items in the production environment and their current dependencies; and
   identify a channel of configuration items through which traffic is routed for each of the plurality of services by identifying a first configuration item from among the plurality of configuration items that the service currently depends upon and a second configuration item from among the plurality of configuration items that currently depends on, or is depended on by, the first configuration item to provide the service,
   wherein each of the first configuration item and the second configuration item comprises redundant links and the dependency between the first configuration item and the second configuration item is determined based on which of the redundant links currently is being used;
   wherein each of the plurality of configuration items includes a label field in which interface alias information may be entered;
   wherein the interface alias information entered into the label field of each of the plurality of configuration items identifies which services each of the plurality of configuration items currently is supporting; and wherein the processor is configured to execute the computer-readable code to identify each of the plurality of configuration items that each service currently depends upon using the data feed from each of the plurality of configuration items in combination with the interface alias information included in the label field of each of the plurality configuration items.

9. The method of claim 8, the method further comprises executing computer-readable program code with a processor to:

separate each of the services into a plurality of service models comprising each of the configuration items that the channel for that service comprises; and separate each of the plurality of service models into a plurality of service layers that each corresponds to a type of supported functionality provided by one or more configuration item in that service layer.

10. The method of claim 9, wherein the method further comprises executing computer-readable program code with a processor to generate a graphical representation of the service models that depicts each of the configuration items that corresponds to the type of functionality of that service layer.

11. The method of claim 10, wherein the graphical representation of the service models further depicts each service that depends on each of the configuration items.

12. The method of claim 11, wherein the method further comprises executing computer-readable program code with a processor to generate a graphical representation of the services and configuration items that depend from any one configuration item when that one configuration item is selected from the graphical representation of the service models.

13. The method of claim 10, wherein the service layers comprise two or more of:

an applications layer that corresponds to one or more of the plurality of configuration items that is configured to provide one or more applications that corresponds to one or more of the plurality of services;

a data storage layer that corresponds to one or more of the plurality of configuration items that is configured to manage data for the one or more applications; and a network connectivity layer that corresponds to one or more of the plurality of configuration items that is configured to connect the configuration items in the applications layer and the data storage layer to each other and/or a client.

14. The apparatus of claim 8, wherein the processor is further configured to generate a graphical representation of the production environment that depicts the plurality of configuration items and their dependencies on one another.

15. A computer program product comprising a non-transitory computer-readable storage medium configured to be executed by a processor to determine which of a plurality of services provided by a production environment depend on which of a plurality of configuration items in the production environment, the non-transitory computer-readable storage medium comprising:

computer-readable program code configured to monitor each of the plurality of configuration items in the production items via a separate data feed from each of the plurality of configuration items;

computer-readable program code configured to determine from each data feed which of the plurality of configuration items that each of the plurality of services currently depends upon in the production environment;

computer-readable program code configured to generate based on the determination a model of the production environment that identifies the plurality of configuration items in the production environment and their current dependencies; and computer-readable program code configured to identify a channel of configuration items through which traffic is routed for each of the plurality of services by identifying a first configuration item from among the plurality of configuration items that the service currently depends upon and a second configuration item from among the plurality of configuration items that currently depends on, or is depended on by, the first configuration item to provide the service, wherein each of the first configuration item and the second configuration item comprises redundant links and the dependency the first configuration item and the second configuration item is determined based on which of the redundant links currently is being used;

wherein each of the plurality of configuration items includes a label field in which interface alias information may be entered;

wherein the interface alias information entered into the label field of each of the plurality of configuration items identifies which services each of the plurality of configuration items currently is supporting; and wherein the processor is configured to execute the computer-readable code to identify each of the plurality of configuration items that each service currently depends upon using the data feed from each of the plurality of configuration items in combination with the interface alias information included in the label field of each of the plurality of configuration items.

16. The computer program product of claim 15, wherein the non-transitory computer-readable storage medium further comprises:

computer-readable program code configured to separate each of the services into a plurality of service models comprising each of the configuration items that the channel for that service comprises; and computer-readable program code configured to separate each of the plurality of service models into a plurality of service layers that each corresponds to a type of supported functionality provided by one or more configuration item in that service layer.

17. The computer program product of claim 16, wherein the non-transitory computer-readable storage medium further comprises computer-readable program code configured to execute computer-readable program code to generate a graphical representation of the service models that depicts each of the configuration items that corresponds to the type of functionality of that service layer.

18. The computer program product of claim 17, wherein the graphical representation of the service models further depicts each service that depends on each of the configuration items.

19. The computer program product of claim 18, wherein the non-transitory computer-readable storage medium further comprises computer-readable program code configured to generate a graphical representation of the services and configuration items that depend from any one configuration item when that one configuration item is selected from the graphical representation of the service models.

20. The computer program product of claim 19, wherein the service layers comprise two or more of:

an applications layer that corresponds to one or more of the plurality of configuration items that is configured to provide one or more applications that corresponds to one or more of the plurality of services;

a data storage layer that corresponds to one or more of the plurality of configuration items that is configured to manage data for the one or more applications; and a network connectivity layer that corresponds to one or more of the plurality of configuration items that is configured to connect the configuration items in the applications layer and the data storage layer to each other and/or a client.

21. The computer program product of claim 15, wherein the non-transitory computer-readable storage medium further comprises computer-readable program code configured to generate a graphical representation of the production environment that depicts the plurality of configuration items and their dependencies on one another.

\* \* \* \* \*